(12) United States Patent
Park et al.

(10) Patent No.: US 12,125,641 B2
(45) Date of Patent: Oct. 22, 2024

(54) DIELECTRIC COMPOSITION AND MULTILAYER CAPACITOR COMPRISING THE SAME

(71) Applicant: SAMSUNG ELECTRO-MECHANICS CO., LTD., Suwon-si (KR)

(72) Inventors: Hui Sun Park, Suwon-si (KR); Seok Hyun Yoon, Suwon-si (KR); Jin Woo Kim, Suwon-si (KR); Jeong Wook Seo, Suwon-si (KR); Hyeg Soon An, Suwon-si (KR); Tae Hyung Kim, Suwon-si (KR); Hyo Ju Lee, Suwon-si (KR); Hee Sun Chun, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 292 days.

(21) Appl. No.: 17/568,136

(22) Filed: Jan. 4, 2022

(65) Prior Publication Data

US 2023/0119343 A1 Apr. 20, 2023

(30) Foreign Application Priority Data

Oct. 20, 2021 (KR) ........................ 10-2021-0140052

(51) Int. Cl.
*H01G 4/12* (2006.01)
*C04B 35/468* (2006.01)
*H01G 4/012* (2006.01)
*H01G 4/232* (2006.01)

(52) U.S. Cl.
CPC ....... *H01G 4/1227* (2013.01); *C04B 35/4682* (2013.01); *C04B 2235/3206* (2013.01); *C04B 2235/3224* (2013.01); *C04B 2235/3236* (2013.01); *C04B 2235/768* (2013.01); *H01G 4/012* (2013.01); *H01G 4/2325* (2013.01)

(58) Field of Classification Search
CPC ........ C04B 35/4682; C04B 2235/3206; C04B 2235/3224; C04B 2235/3236; C04B 2235/768; H01G 4/012; H01G 4/1227; H01G 4/2325
See application file for complete search history.

(56) References Cited

U.S. PATENT DOCUMENTS

2009/0086407 A1 4/2009 Takahashi et al.
2016/0307701 A1* 10/2016 Park ................... H01G 4/1245
2023/0335338 A1* 10/2023 An ............................ H01G 4/12

FOREIGN PATENT DOCUMENTS

KR 10-2009-0033099 A 4/2009
KR 10-2016-0123645 A 10/2016

* cited by examiner

*Primary Examiner* — Nathan Milakovich
(74) *Attorney, Agent, or Firm* — Morgan, Lewis & Bockius LLP (57) ABSTRACT

A dielectric composition includes a BaTiO₃-based component as a main component, a donor component including a first element and a second element each having a shorter ionic radius and greater atomic weight than Ba, and an acceptor component including at least one of Mg, Al, Mn and V. An ionic radius of the second element is greater than an ionic radius of the first element, a molar content of the second element is less than a molar content of the first element, and a molar content of the acceptor component is greater than a molar content of the donor component.

20 Claims, 5 Drawing Sheets

| Additive content(mol%) relative to BT 100mol (mol%) | | | | | | | | | | | | | Reliability Determination (O,X) |
|---|---|---|---|---|---|---|---|---|---|---|---|---|---|
| Dy | Sm | Gd | Tb | Mn | Mg | V | Al | Sm/La | La | D/A | Early IR | Late IR | |
| 0.94 | 0.18 | 0.00 | 0.00 | 0.36 | 0.04 | 2.36 | 4.81 | 0.19 | 1.11 | 0.15 | 1.48E+05 | 1.90E+05 | O |
| 0.94 | 0.13 | 0.00 | 0.00 | 0.36 | 0.04 | 2.36 | 4.81 | 0.14 | 1.07 | 0.14 | 1.85E+05 | 1.71E+05 | O |
| 0.94 | 0.09 | 0.00 | 0.00 | 0.36 | 0.04 | 2.36 | 4.81 | 0.10 | 1.02 | 0.14 | 1.81E+05 | 2.12E+05 | O |
| 0.94 | 0.04 | 0.00 | 0.00 | 0.36 | 0.04 | 2.36 | 4.81 | 0.05 | 0.98 | 0.13 | 1.92E+05 | 2.21E+05 | O |
| 1.16 | 0.18 | 0.00 | 0.18 | 0.36 | 0.04 | 2.36 | 4.81 | 0.15 | 1.34 | 0.18 | 2.18E+05 | 1.77E+05 | O |
| 0.94 | 0.18 | 0.00 | 0.00 | 0.36 | 0.04 | 2.36 | 4.81 | 0.16 | 1.29 | 0.17 | 1.57E+05 | 1.76E+05 | O |
| 2.23 | 0.18 | 0.00 | 0.00 | 0.36 | 0.04 | 2.36 | 4.81 | 0.08 | 2.41 | 0.32 | 2.00E+04 | 2.04E+04 | X |
| 0.94 | 0.22 | 0.00 | 0.18 | 0.36 | 0.04 | 2.36 | 4.81 | 0.24 | 1.16 | 0.15 | 7.33E+04 | 5.92E+04 | X |
| 0.94 | 0.04 | 0.00 | 0.00 | 0.36 | 0.04 | 2.36 | 4.81 | 0.04 | 0.97 | 0.13 | 1.78E+06 | 9.03E+04 | X |
| 0.94 | 0.04 | 0.00 | 0.00 | 0.36 | 0.04 | 2.36 | 4.81 | 0.03 | 1.15 | 0.15 | 8.43E+04 | 8.26E+04 | X |
| 0.94 | 0.04 | 0.00 | 0.00 | 2.67 | 0.04 | 2.36 | 4.81 | 0.05 | 0.98 | 0.10 | 6.89E+07 | 2.28E+05 | X |

DIELECTRIC COMPOSITION AND MULTILAYER CAPACITOR COMPRISING THE SAME

CROSS-REFERENCE TO RELATED APPLICATION

This application claims benefit under 35 USC 119(a) of Korean Patent Application No. 10-2021-0140052 filed on Oct. 20, 2021 in the Korean Intellectual Property Office, the entire disclosure of which is incorporated herein by reference.

TECHNICAL FIELD

The present disclosure relates to a dielectric composition and a multilayer capacitor comprising the same.

BACKGROUND

Multilayer capacitors are widely used as components of electronic devices such as computers, PDAs, and mobile phones due to having a small size, high capacitance, and ease in mounting, and are widely used as parts for electric devices (including vehicles) due to high reliability and high strength characteristics thereof.

As the dielectric constant of the dielectric composition included in a multilayer capacitor increases, the capacitance-to-size of the multilayer capacitor may be high, and the capacitance-to-size ratio may be more important in multilayer capacitors for electronic devices.

As the insulation resistance of a dielectric composition that may be included in a multilayer capacitor is higher, the multilayer capacitor may have a high withstand voltage/withstand power, and the withstand voltage/withstand power may be more important in multilayer capacitors for electric devices.

As the reliability of the dielectric composition that may be included in a multilayer capacitor increases, the defect rate in the mass production process of multilayer capacitors may be reduced, and a multilayer capacitor may have a long lifespan and may be used in more diverse environments.

SUMMARY

This summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

An aspect of the present disclosure is to provide a dielectric composition and a multilayer capacitor including the same.

According to a first aspect of the present disclosure, a dielectric composition includes a $BaTiO_3$-based component as a main component; a donor component including a first element and a second element each having a shorter ionic radius and a greater atomic weight than Ba; and an acceptor component including at least one of Mg, Al, Mn and V. An ionic radius of the second element is greater than an ionic radius of the first element, a molar content of the second element is less than a molar content of the first element, and a molar content of the acceptor component is greater than a molar content of the donor component.

In some embodiments, the first element may comprise dysprosium (Dy), and the second element may comprise samarium (Sm).

In some embodiments, in the donor component, a total molar content of a lanthanide element including the first and second elements may be greater than 0 mol and less than 2.41 mol relative to 100 mol of titanium (Ti) as the main component.

In some embodiments, a ratio of the molar content of the second element to the total molar content of the lanthanide element in the donor component may be greater than 0.04 and less than 0.24.

In some embodiments, the molar content of the second element may be greater than 0 mol and less than 0.22 mol relative to 100 mol of titanium (Ti) as the main component.

In some embodiments, a ratio of the molar content of the donor component to the molar content of the acceptor component may be greater than 0.1 and less than 0.32.

In some embodiments, the dielectric composition may exclude Gd.

In some embodiments, the acceptor component may include Mg.

In some embodiments, the dielectric composition consists of the BaTiO3-based component, the donor component consisting of dysprosium (Dy) and samarium (Sm), and the acceptor component consisting of Mg, Al, Mn, and V.

According to a second aspect of the present disclosure, a dielectric composition includes a $BaTiO_3$-based component as a main component; and an accessory component including a lanthanide element including dysprosium (Dy) and samarium (Sm). A total molar content of the lanthanide element in the accessory component is greater than 0 mol and less than 2.41 mol relative to 100 mol of titanium (Ti) as the main component, and a ratio of a molar content of the samarium (Sm) to the total molar content of the lanthanide element in the accessory component is greater than 0.04 and less than 0.24.

In some embodiments, the total molar content of the lanthanide element in the accessory component may be greater than 0 mol and less than 1.35 mol relative to 100 mol of titanium (Ti) as the main component. The molar content of the samarium in the accessory component may be greater than 0 mol and less than 0.22 mol relative to 100 mol of titanium (Ti) as the main component.

In some embodiments, the accessory component may further comprise at least one of Mg, Al, Mn, and V. A total molar content of Mg, Al, Mn, and V in the accessory component may be greater than the total molar content of the lanthanide element in the accessory component.

In some embodiments, a ratio of the total molar content of the lanthanide element in the accessory component to the total molar content of Mg, Al, Mn, and V in the accessory component may be greater than 0.1 and less than 0.32.

In some embodiments, the dielectric composition may exclude Gd.

In some embodiments, the accessory component may comprise Mg.

In some embodiments, the dielectric composition consists of the BaTiO3-based component, and the accessory component consisting of dysprosium (Dy), samarium (Sm), Mg, Al, Mn and V.

According to a third aspect of the present disclosure, a multilayer capacitor includes a body having a laminated structure in which at least one first internal electrode and at least one second internal electrode are alternately stacked in a first direction with at least one dielectric layer interposed therebetween; and first and second external electrodes disposed on the body and spaced apart from each other to be connected to the at least one first internal electrode and the at least one second internal electrode, respectively. The at least one dielectric layer includes the dielectric composition described according to the first aspect.

According to a fourth aspect of the present disclosure, a multilayer capacitor includes a body having a laminated structure in which at least one first internal electrode and at least one second internal electrode are alternately stacked in a first direction with at least one dielectric layer interposed therebetween, and first and second external electrodes disposed on the body and spaced apart from each other to be connected to the at least one first internal electrode and the at least one second internal electrode, respectively. The at least one dielectric layer includes the dielectric composition described according to the second aspect.

BRIEF DESCRIPTION OF DRAWINGS

The above and other aspects, features, and advantages of the present inventive concept will be more clearly understood from the following detailed description, taken in conjunction with the accompanying drawings, in which.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed, as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an embodiment or example, e.g., as to what an embodiment or example may include or implement, means that at least one embodiment or example exists in which such a feature is included or implemented while all examples and examples are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after gaining an understanding of the disclosure of this application. Further, although the examples described herein have a variety of configurations, other configurations are possible as will be apparent after an understanding of the disclosure of this application.

The drawings may not be to scale, and the relative sizes, proportions, and depiction of elements in the drawings may be exaggerated for clarity, illustration, and convenience.

When the direction of the parallelepiped is defined to clearly describe the embodiments of the present disclosure, L, W, and T indicated in the drawings represent a length direction, a width direction, and a thickness direction, respectively. In this case, the thickness direction may be used as the same concept as the stacking direction in which the dielectric layers are stacked.

Hereinafter, a multilayer capacitor according to an embodiment will be described, and in detail, a multilayer ceramic capacitor will be described, but the present disclosure is not limited thereto.

Figure 1:
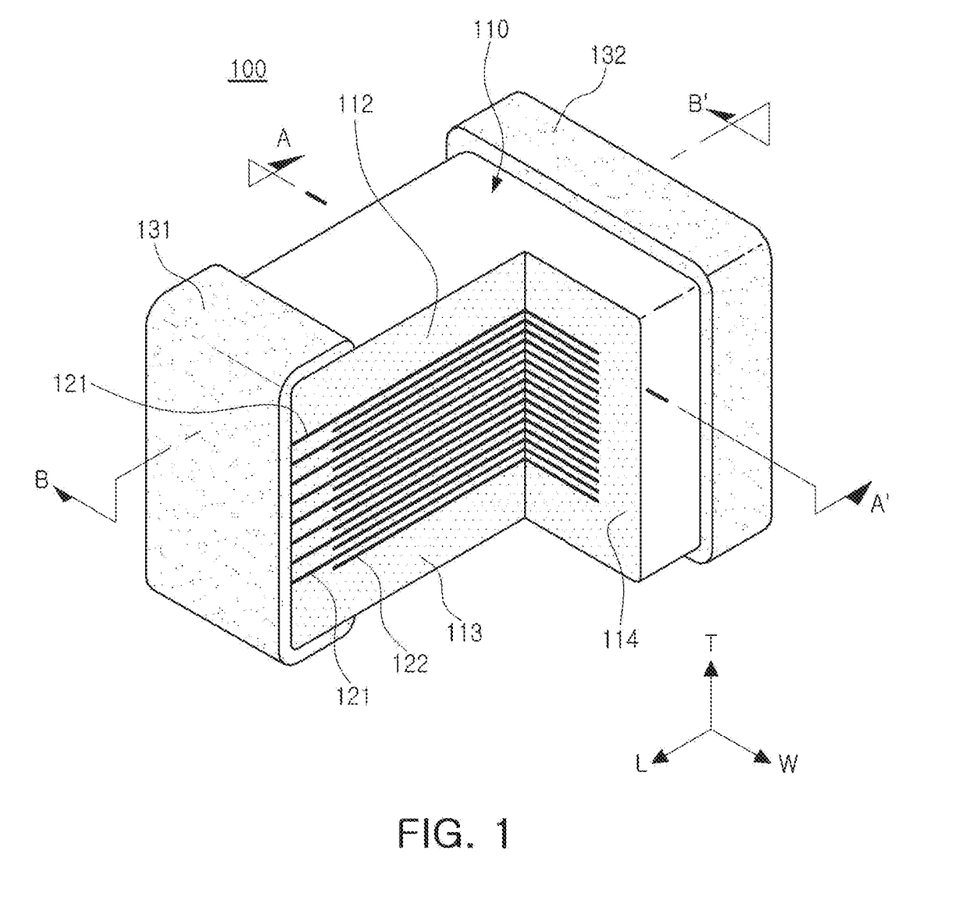
FIG. 1 is a perspective view illustrating a multilayer capacitor including a dielectric composition according to an embodiment of the present disclosure.
Figure 2:
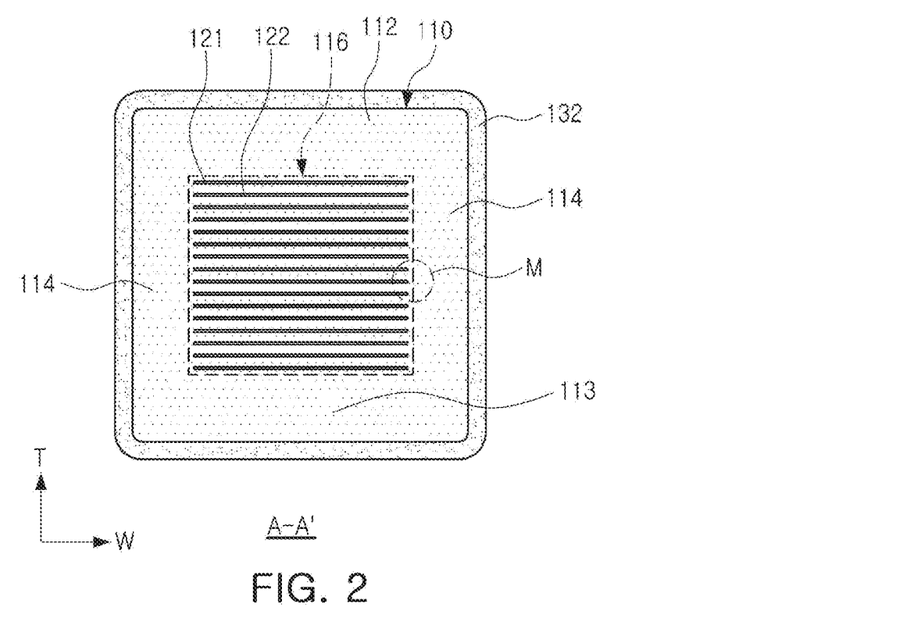
FIG. 2 is a cross-sectional view taken along line A-A' of FIG. 1.
Figure 3:
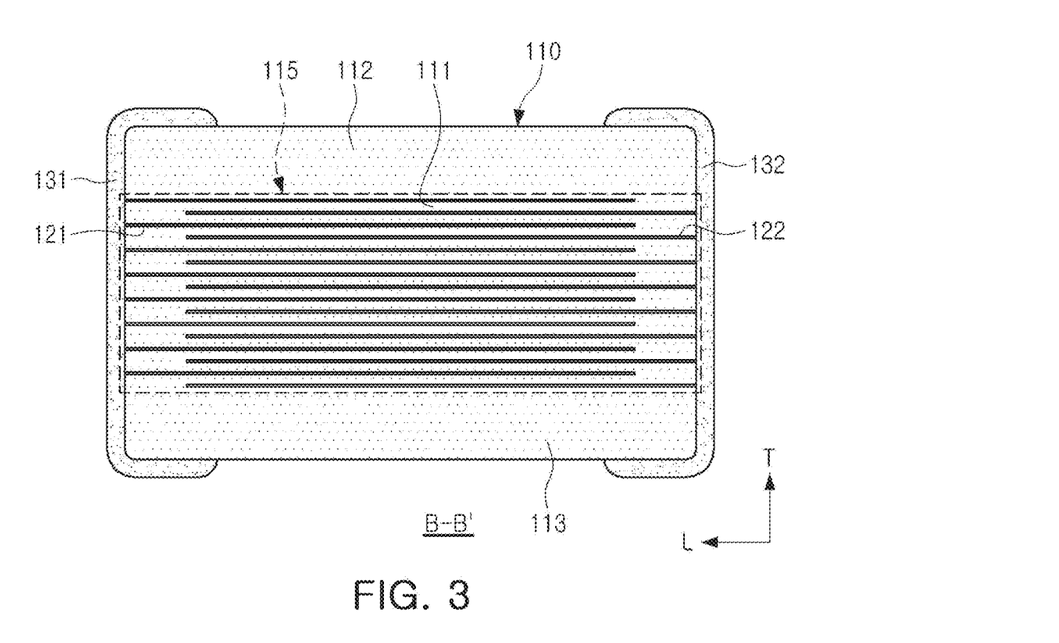
FIG. 3 is a cross-sectional view taken along line B-B' of FIG. 1.

FIG. 1 is a perspective view illustrating a multilayer capacitor including a dielectric composition according to an embodiment of the present disclosure. FIG. 2 is a cross-sectional view taken along line A-A' of FIG. 1. FIG. 3 is a cross-sectional view taken along line B-B' of FIG. 1.

Referring to FIGS. 1, 2 and 3, a multilayer capacitor 100 may include a dielectric composition according to an embodiment of the present disclosure, and may include a body 110, a first external electrode 131, and a second external electrode 132. FIG. 1 illustrates a shape cut by about ¼ of the volume to illustrate the inside of the body 110, but the actual multilayer capacitor 100 may not be cut by about ¼ of the volume and may have an approximately symmetrical shape with respect to each of the L direction, the W direction, and the T direction from the center.

The body 110 may have a laminated structure in which at least one first internal electrode 121 and at least one second internal electrode 122 are alternately stacked in a first direction (e.g., T direction) with at least one dielectric layer 111 interposed therebetween.

For example, the body 110 may be formed as a ceramic body by sintering the laminated structure. In this case, the at least one dielectric layer 111 disposed on the body 110 is in a sintered state, and the boundary between adjacent dielectric layers may be integrated to the extent that it is difficult to check without using a scanning electron microscope (SEM).

For example, the body 110 may be formed of a hexahedron having both sides in the longitudinal direction (L), both sides in the width direction (W), and both sides in the thickness direction (T), and the edges and/or the corners of the hexahedron may be rounded as they are polished. However, the shape and size of the body 110 and the number of stacked dielectric layers 111 are not limited to those illustrated in the present embodiment.

The thickness of the at least one dielectric layer 111 may be arbitrarily changed according to the capacitance design of the multilayer capacitor 100, and may include the dielectric composition according to an embodiment.

The average particle diameter of the ceramic powder used to form the at least one dielectric layer 111 is not particularly limited, and may be adjusted according to the required standard, (for example, small size and/or high capacitance required like in capacitors for electronic devices, or high withstand voltage characteristics and/or strong strength required like in capacitors for electrical devices) of the multilayer capacitor 100, for example, may be adjusted to 400 nm or less.

For example, the at least one dielectric layer 111 may be formed by preparing a plurality of ceramic sheets formed by applying and drying a slurry formed including powder such as barium titanate ($BaTiO_3$) on a carrier film. The ceramic sheet may be formed by preparing a slurry by mixing ceramic powder, a binder, and a solvent, and manufacturing the slurry in a sheet shape having a thickness of several μm by a doctor blade method, but the formation method is not limited thereto.

At least one first internal electrode 121 and at least one second internal electrode 122 may be formed by printing a conductive paste including a conductive metal, to be exposed alternately to one side and the other side of the body 110 in the length direction L, in the stacking direction of the dielectric layers (e.g., the T direction), and may be electrically insulated from each other by the dielectric layer disposed therebetween.

For example, each of the at least one first internal electrode 121 and the at least one second internal electrode 122 may be formed using a conductive paste for internal electrodes, which includes 40 to 50 wt % of conductive metal powder having an average particle size of 0.1 to 0.2 μm, but the material is not limited thereto. The conductive paste may be nickel (Ni), copper (Cu), palladium (Pd), silver (Ag), lead (Pb) or platinum (Pt) alone, or alloys thereof, and the present disclosure is not limited thereto.

For example, an internal electrode pattern may be formed by coating the conductive paste for an internal electrode on the ceramic sheet by a printing method or the like. As the method for printing the conductive paste, a screen printing method, a gravure printing method, an inkjet printing method, or the like may be used, but the present disclosure is not limited thereto. For example, the body 110 may be manufactured by laminating 200 to 300 layers of the ceramic sheet printed with the internal electrode pattern, pressing, and sintering the same.

The capacitance of the multilayer capacitor 100 may be proportional to an overlapping area in the stacking direction (e.g., in the T direction) between the at least one first internal electrode 121 and the at least one second internal electrode 122, and may be proportional to the total number of stacking of the at least one internal electrode 121 and the at least one second internal electrode 122, and may be inversely proportional to the distance between the at least one first internal electrode 121 and the at least one second internal electrode 122. The distance may be substantially equal to the thickness of each of the at least one dielectric layer 111.

The multilayer capacitor 100 may have a larger capacitance compared to the thickness as the distance between the at least one first internal electrode 121 and the at least one second internal electrode 122 decreases. On the other hand, the withstand voltage of the multilayer capacitor 100 may be higher as the distance increases. Accordingly, the distance may be adjusted in accordance with the required standard of the multilayer capacitor 100 (e.g., miniaturization and/or high capacitance are required, such as a capacitor for electronic devices, or high withstand voltage characteristics and/or strong strength are required, such as a capacitor for an electric device). The thickness of each of the at least one first internal electrode 121 and the at least one second internal electrode 122 may also be affected by the distance.

For example, in the multilayer capacitor 100, when relatively high withstand voltage characteristics and/or strong strength are required, the distance between the at least one first internal electrode 121 and the at least one second internal electrode 122 may be designed to exceed twice each thickness thereof. For example, when miniaturization and/or high capacitance are required, the multilayer capacitor 100 may be designed, such that a thickness of each of at least one first internal electrode 121 and at least one second internal electrode 122 is 0.4 μm or less, and the number of a total of stacked layers is 400 or more.

The first and second external electrodes 131 and 132 may be disposed on the body 110 to be spaced apart from each other, to be connected to the at least one first internal electrode 121 and the at least one second internal electrode 122, respectively.

For example, the first and second external electrodes 131 and 132 may be respectively formed by a method of dipping into a paste containing a metal component, a conductive paste printing method, a sheet transfer or pad transfer method, sputter plating, electrolytic plating, or the like. For example, the first and second external electrodes 131 and 132 may include a sintered layer formed as the paste is sintered, and a plating layer formed on an outer surface of the sintered layer, and may further include a conductive resin layer disposed between the sintered layer and the plating layer. For example, the conductive resin layer may be formed as conductive particles are contained in a thermosetting resin such as epoxy. The metal component may be copper (Cu), palladium (Pd), platinum (Pt), gold (Au), silver (Ag), lead (Pb) or tin (Sn) along, or may be alloys thereof, but the material is not limited thereto.

The multilayer capacitor 100 may be mounted or embedded in an external substrate (e.g., a printed circuit board), and may be connected to at least one of wiring, land, solder, and bump of the external substrate through the first and second external electrodes 131 and 132, and thus, may be electrically connected to a circuit (e.g., an integrated circuit, a processor) electrically connected to the external substrate.

Referring to FIGS. 1, 2 and 3, the body 110 may include an upper cover layer 112, a lower cover layer 113, and a core region 115, and the core region 115 may include a margin region 114 and a capacitance region 116.

The upper and lower cover layers 112 and 113 may be disposed to have the core region 115 interposed therebetween in the first direction (e.g., the T direction), and may be thicker than each of the dielectric layers 111.

The upper and lower cover layers 112 and 113 may prevent external environmental elements (e.g., moisture, plating solution, foreign substances) from penetrating into the core region 115, protect the body 110 from external impact, and improve the bending strength of the body 110.

For example, the upper and lower cover layers 112 and 113 may include the same material as the at least one dielectric layer 111 or a different material (e.g., a thermosetting resin such as an epoxy resin).

Since the capacitance region 116 may include between the at least one first internal electrode 121 and the at least one second internal electrode 122, the capacitance of the multilayer capacitor 100 may be formed.

The capacitance region 116 may include a laminated structure in which at least one first internal electrode 121 and at least one second internal electrode 122 are alternately stacked in a first direction (e.g., a T direction) with at least one dielectric layer 111 interposed therebetween, and may have the same size as the laminated structure.

The margin region 114 may include a boundary line between the at least one first internal electrode 121 and the at least one second internal electrode 122 and the surface of the body 110.

The plurality of margin regions 114 may be disposed to sandwich the capacitance region 116 in a second direction (e.g., W direction) perpendicular to the first direction (e.g., T direction). For example, the plurality of margin regions 114 may be formed in a manner similar to that of the at least one dielectric layer 111, (but a stacking direction thereof is different therefrom), and may include the dielectric composition according to an embodiment of the present disclosure.

The plurality of margin regions 114 may prevent the at least one first internal electrode 121 and the at least one second internal electrode 122 from being exposed from the body 110 to the surface in the second direction (e.g., the W direction). Therefore, external environmental factors (e.g., moisture, plating solution, foreign substances) may be prevented from penetrating into the at least one first internal electrode 121 and the at least one second internal electrode 122 through the surface in the second direction, and the reliability and lifespan of the multilayer capacitor 100 may be improved. In addition, since the at least one first internal electrode 121 and the at least one second internal electrode 122 may be formed to efficiently expand in the second direction due to the plurality of margin regions 114, the plurality of margin regions may allow the overlapping area of the at least one first internal electrode 121 and the at least one second internal electrode 122 to increase, thereby contributing to an improvement in the capacitance of the multilayer capacitor 100.

The dielectric composition according to an embodiment may include a $BaTiO_3$-based main component as a perovskite-based $ABO_3$ structure, and thus may have a relatively high dielectric constant and increase the capacitance of the multilayer capacitor.

In the present specification, the "main component" may refer to a component that occupies a relatively large proportion by weight compared to other components, and may refer to a component of 50% by weight or more based on the weight of the entire composition or the entire dielectric layer. In addition, "accessory component" may refer to a component that occupies a relatively small weight ratio compared to other components, and may refer to a component that is less than 50% by weight based on the weight of the entire composition or the entire dielectric layer. In addition, the dielectric composition according to an embodiment may contain various ceramic additives, organic solvents, plasticizers, binders, dispersants, and the like in addition to the accessory components and the main component of dielectric. For example, the dielectric composition may include polyvinyl alcohol (PVA), polyvinyl butyral (PVB), an acrylic resin, or the like as a binder.

The accessory component included in the dielectric composition according to an embodiment may include a donor component and an acceptor component.

The donor component and the acceptor component may be solid-solubilized by substituting for A (corresponding to Ba) and B (corresponding to Ti) of the $ABO_3$ structure of the main component, respectively.

The donor component may include an element (e.g., a lanthanide element) having a shorter ionic radius and greater atomic weight than barium (Ba). Since the valence of barium (Ba) is +2, and the donor component may have a valence of +3 (fixed-valence of +3), a portion of the main component in which the donor component is substituted and solid-solubilized may further have a single positive charge. Accordingly, as the donor component is substituted and solid-solubilized in a portion of the $BaTiO_3$-based main component, the concentration of oxygen (O) vacancies may decrease, and the reliability of the dielectric composition may be improved.

The donor component may include first and second elements each having a shorter ionic radius and higher atomic weight than barium (Ba), and the ionic radius of the second element may be greater than an ionic radius of the first element.

Since the ionic radius of the second element may have an ionic radius between the ionic radius of barium (Ba) and the ionic radius of the first element, the second element may have an intermediate characteristic between the characteristic of +2 valence that may correspond to the ionic radius of barium (Ba) and the characteristic of +3 valence that may correspond to the ionic radius of the first element.

Therefore, in a limiting situation in the process in which the first element replaces the main component of barium (Ba), the second element may enable some barium (Ba) of the unsubstituted main component to be more substituted, and may also reduce the concentration of oxygen (O) vacancies in the main component. As a result, the donor component including the first and second elements may be more effectively substituted and solid-solubilized in the main component, and may more effectively reduce the concentration of oxygen (O) vacancies in the main component.

The ionic radius of barium (Ba) is 1.35 Å, and the ionic radii of La, Ce, Pr, Nd, Sm, Gd, and Dy, which are lanthanide elements, are 1.03 Å, 1.02 Å, 0.99 Å, 0.98 Å, 0.96 Å, 0.94 Å, and 0.92 Å, respectively. For example, the first element may be dysprosium (Dy) having an ionic radius shorter than 1.35 Å, and the second element may be samarium (Sm) having an ionic radius shorter than 1.35 Å and greater than 0.92 Å.

On the other hand, the insulation resistance (IR) may decrease according to the substitution and dissolution of the donor component including the first and second elements, and the relatively low insulation resistance (IR) may decrease the withstand voltage and/or reliability of the multilayer capacitor.

The dielectric composition according to an embodiment of the present disclosure may have relatively high insulation resistance (IR) and/or reliability while using a donor component including the first and second elements.

First, the molar content of the second element may be less than the molar content of the first element. Since the second element may have a greater influence on a description in the insulation resistance (IR) according to an intermediate characteristic between the +2 valence characteristic and the +3 valence characteristic, the dielectric composition according to an embodiment of the present disclosure may suppress a decrease in insulation resistance (IR) by using a donor component including a relatively large number of first elements and a small number of second elements.

The acceptor component may include at least one of Mg, Al, Mn, and V. The acceptor component including at least one of Mg, Al, Mn, and V may be an effective element to suppress a decrease in insulation resistance (IR) caused by an increase in a donor component. Usually, an electron corresponding to a donor component and a hole corresponding to an acceptor component may interact one-to-one.

The molar content of the acceptor component may be greater than the molar content of the donor component. Accordingly, a large amount of the acceptor component may more effectively suppress the decrease in insulation resistance (IR) due to the donor component.

Figure 4:
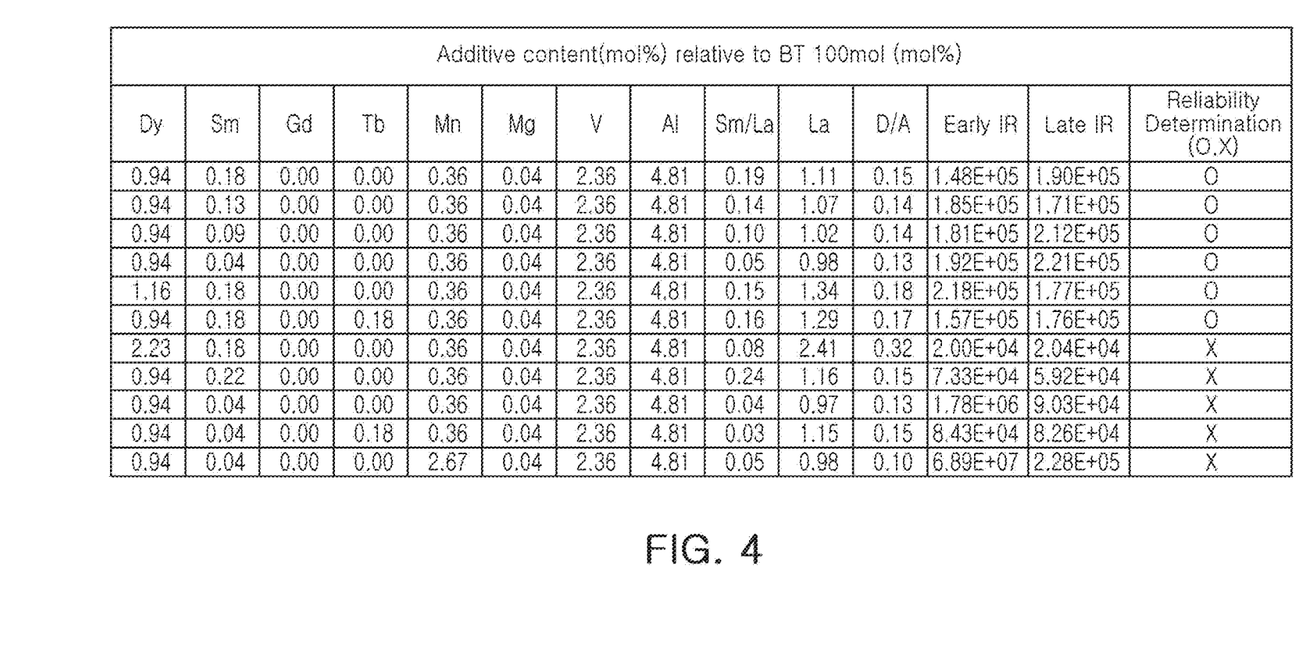
FIG. 4 is a table illustrating insulation resistance (IR) and reliability of a multilayer capacitor according to the various example dielectric compositions of the present disclosure.

FIG. 4 is a table illustrating the insulation resistance (IR) and reliability of a multilayer capacitor according to various example dielectric compositions of the present disclosure, and illustrates a total of 11 detailed composition examples (prototype multilayer capacitor samples), but the present disclosure is not limited thereto. O of reliability indicates relatively high reliability compared to X, and X of reliability indicates relatively low reliability compared to O, and may not indicate a failure of the dielectric composition and the multilayer capacitor. For example, the difference between O and X in reliability may be large, but may not be a criterion for determining good or bad quality of the dielectric composition and the multilayer capacitor.

The content of each accessory component (additive) in FIG. 4 represents a molar content relative to 100 mol of barium titanate ($BaTiO_3$) or titanium (Ti). Throughout the specification, molar content does not distinguish addition forms such as oxides or carbonates. For example, 0.1 mol of $V_2O_5$, which is an oxide of V, which may be an acceptor component, may be equal to 0.2 mol of V.

For example, the molar content may be measured visually by analysis using at least one of Transmission Electron Microscopy (TEM), Atomic Force Microscope (AFM), Scanning Electron Microscope (SEM), optical microscope and a surface profiler, or may be measured in mass by the relationship between weight and volume, or may also be measured indirectly by substances that are extracted through chemical reactions.

Referring to FIG. 4, the dielectric composition according to an embodiment of the present disclosure may include at least a portion of dysprosium (Dy), samarium (Sm), gadolinium (Gd), terbium (Tb), manganese (Mn), magnesium (Mg), vanadium (V), and aluminum (Al), as an accessory component (additive).

In FIG. 4, the total molar content of the lanthanide element (La) is calculated as the total molar content of dysprosium (Dy), samarium (Sm), gadolinium (Gd) and terbium (Tb), and the molar contents illustrated in FIG. 4 may be values rounded off to the third decimal place, and the total molar content may be a value rounded up after being calculated from each molar content before rounding.

In detailed compositional examples in the first to sixth lines of FIG. 4, the total molar content of the lanthanide element (La) may be in the range of more than 0 mol and less than 2.41 mol, relative to 100 mol of titanium as the main component, and the ratio of the molar content of samarium (Sm) to the total molar content of the lanthanide element (La) may be in the range of greater than 0.04 and less than 0.24. Accordingly, insulation resistance (initial IR) before and insulation resistance (late IR) after being subjected to a harsh environment (e.g., 7.56V applied at a temperature of 115 degrees Celsius) for a predetermined period of time (e.g., 48 hours) may exceed a predetermined insulation resistance (e.g., 105 ohm), and thus, relatively high insulation resistance and reliability may be obtained.

In the detailed composition example of the seventh line of FIG. 4, since the total molar content of the lanthanide element (La) is 2.41 mol or more, relative to 100 mol of titanium as the main component, the insulation resistance (initial IR, late IR) may be relatively low.

In the detailed composition example of the eighth line of FIG. 4, since the ratio of the molar content of samarium (Sm) to the total molar content of the lanthanide element (La) is 0.24 or more, the insulation resistance (initial IR, late IR) may be relatively low.

In the detailed composition examples of the ninth and tenth lines of FIG. 4, since the ratio of the molar content of samarium (Sm) to the total molar content of the lanthanide element (La) is 0.04 or less, the difference between the insulation resistance (initial IR) before and the insulation resistance (late IR) after the harsh environment for a predetermined time may be large, the reliability may be relatively low.

Accordingly, the dielectric composition according to an embodiment of the present disclosure contains a lanthanide element (La) having a total molar content of greater than 0 mol and less than 2.41 mol, relative to 100 mol of titanium as the main component, and may have greater than 0.04 and less than 0.24 in a ratio of the molar content of samarium (Sm) to the total molar content of the lanthanum element (La). Therefore, relatively high insulation resistance and reliability may be obtained.

In addition, in the detailed composition examples of the first to sixth lines of FIG. 4, the total molar content of the lanthanide element of the accessory component is less than 1.35 mol relative to 100 mol of titanium (Ti) as the main component, and the molar content of samarium (Sm) in the accessory component may be more than 0 mol and less than 0.22 mol relative to 100 mol of titanium (Ti) as the main component. Therefore, high insulation resistance and reliability may be obtained.

In the detailed composition example of the eighth line of FIG. 4, since the molar content of samarium (Sm) in the accessory component is 0.22 mol or more compared to 100 mol of titanium (Ti) as the main component, the insulation resistance (initial IR, late IR) may be relatively low.

In addition, in the detailed composition examples of the fifth and sixth lines of FIG. 4, the molar content of dysprosium (Dy) and the molar content of terbium (Tb) may be different from each other, and the total molar contents of dysprosium (Dy) and terbium (Tb) may have almost the same composition, and both thereof may have relatively high insulation resistance and reliability. For example, the lanthanide element (La) (or the first and second elements herein) included in the dielectric composition according to an embodiment of the present disclosure is not limited to dysprosium (Dy) and samarium (Sm). The samarium (Sm) of FIG. 4 may correspond to the second element of the present specification.

In addition, in the detailed composition examples of the first to sixth lines of FIG. 4, the ratio (D/A) of the molar content of the donor component (Dy, Sm, Gd, Tb) to the molar content of the acceptor component (corresponding to Mg, Al, Mn, V) may be in the range of greater than 0.1 and less than 0.32. Accordingly, the insulation resistance (initial IR) before and the insulation resistance (late IR) after going through the harsh environment for a predetermined time may exceed the predetermined insulation resistance, and thus, relatively high insulation resistance and reliability may be obtained.

In the detailed composition example of the seventh line of FIG. 4, the ratio (D/A) of the molar content of the donor component (Dy, Sm, Gd, Tb) to the molar content of the acceptor component (corresponding to Mg, Al, Mn, V) may be 0.32 or more, the insulation resistance (initial IR, late IR) may be relatively low.

In the detailed composition example of the eleventh line of FIG. 4, the ratio (D/A) of the molar content of the donor component (Dy, Sm, Gd, Tb) to the molar content of the acceptor component (corresponding to Mg, Al, Mn, V) may be 0.10 or less, the difference between the insulation resistance (initial IR) before and the insulation resistance (late IR) after going through a harsh environment for a predetermined time may be large, and thus, the reliability may be relatively low.

Figure 5A:
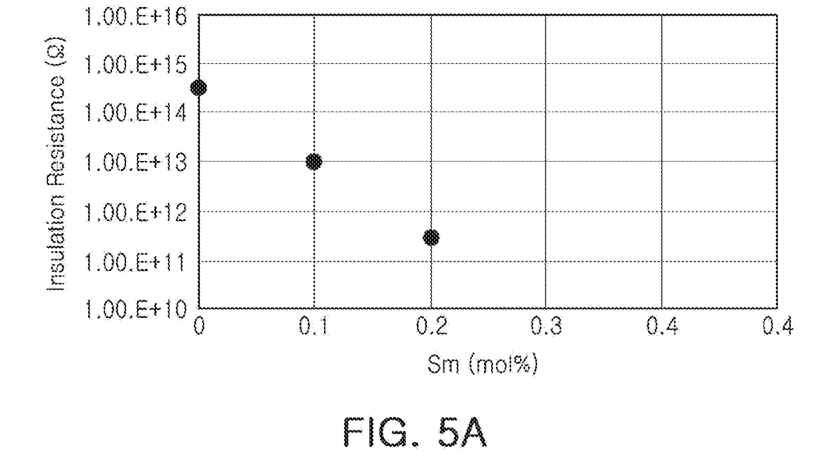
FIG. 5A is a graph illustrating the insulation resistance according to the content of samarium (Sm) in a dielectric composition according to an embodiment of the present disclosure.
Figure 5B:
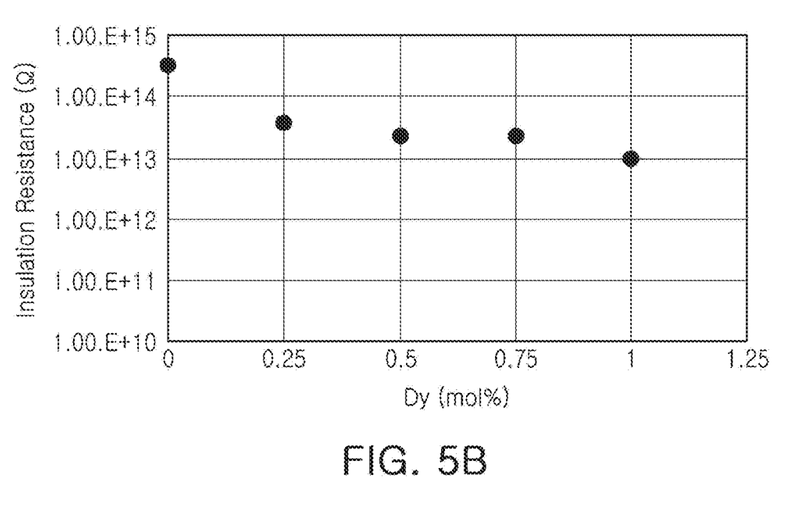
FIG. 5B is a graph illustrating the insulation resistance according to the content of dysprosium (Dy) in a dielectric composition according to an embodiment of the present disclosure.

FIG. 5A is a graph illustrating insulation resistance according to the content of samarium (Sm) in the dielectric composition according to an embodiment of the present disclosure. FIG. 5B is a graph illustrating the content of dysprosium (Dy) in the dielectric composition according to an embodiment of the present disclosure.

Referring to FIGS. 5A and 5B, insulation resistance may decrease as the content of samarium (Sm) and/or dysprosium (Dy) increases, and thus, the dielectric composition according to an embodiment has a relatively low total molar content of the lanthanide element (La). Accordingly high insulation resistance may be obtained.

In addition, the slope of the decrease in insulation resistance as the content of samarium (Sm) increases may be greater than that of dysprosium (Dy). Therefore, the dielectric composition according to an embodiment of the present disclosure has a higher molar content of dysprosium (Dy, corresponding to the first element) than the molar content of samarium (Sm, corresponding to the second element), thereby obtaining relatively high insulation resistance.

Figure 6:
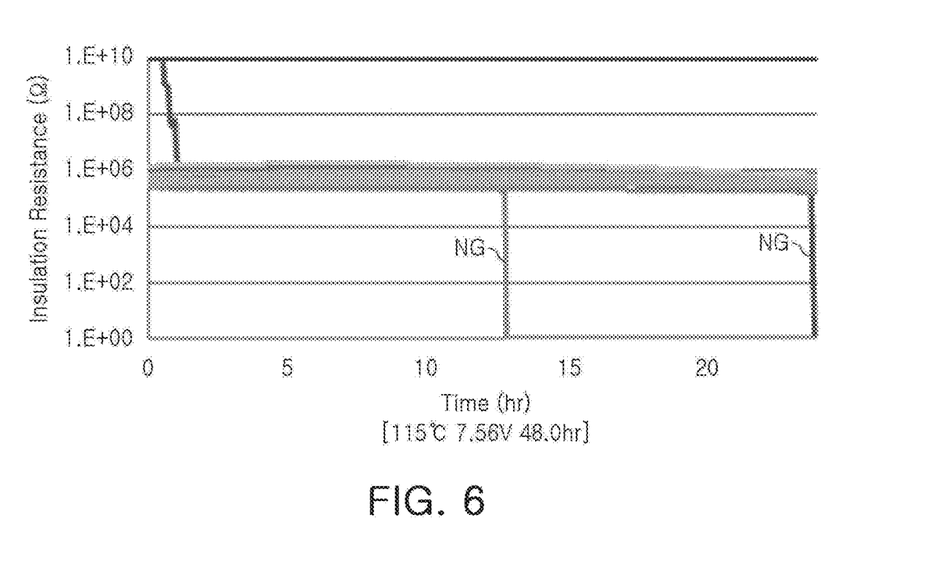
FIG. 6 is a graph illustrating reliability of a multilayer capacitor according to an embodiment of the present disclosure.

FIG. 6 is a graph illustrating reliability of a multilayer capacitor according to an embodiment of the present disclosure.

Referring to FIG. 6, the reliability of the multilayer capacitor according to an embodiment may be measured by the frequency of occurrence of a phenomenon (NG) in which insulation resistance rapidly decreases in a harsh environment (e.g., a state in which 7.56V is applied at a temperature of 115 degrees Celsius) provided for a predetermined time (e.g., 48 hours).

For example, the criterion for determining that the frequency is low may be whether the frequency is lower than the frequency of deviating from 1 sigma of a standard normal distribution, and in a multilayer capacitor including the dielectric composition according to an embodiment, since the frequency of NG may be lower than the reference as illustrated in FIG. 6, high reliability may be obtained.

As set forth above, a dielectric composition according to an embodiment may be provided, and a multilayer capacitor including the same may have overall increased insulation resistance and reliability.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A dielectric composition comprising:
   a $BaTiO_3$-based component as a main component;
   a donor component including a first element and a second element each having a shorter ionic radius and a greater atomic weight than Ba; and
   an acceptor component including at least one of Mg, Al, Mn and V,
   wherein an ionic radius of the second element is greater than an ionic radius of the first element,
   a molar content of the second element is less than a molar content of the first element, and
   a molar content of the acceptor component is greater than a molar content of the donor component.

2. The dielectric composition of claim 1, wherein the first element comprises dysprosium (Dy), and
   the second element comprises samarium (Sm).

3. The dielectric composition of claim 2, wherein in the donor component, a total molar content of a lanthanide element including the first and second elements is greater than 0 mol and less than 2.41 mol relative to 100 mol of titanium (Ti) as the main component.

4. The dielectric composition of claim 3, wherein a ratio of the molar content of the second element to the total molar content of the lanthanide element in the donor component is greater than 0.04 and less than 0.24.

5. The dielectric composition of claim 2, wherein the molar content of the second element is greater than 0 mol and less than 0.22 mol relative to 100 mol of titanium (Ti) as the main component.

6. The dielectric composition of claim 1, wherein a ratio of the molar content of the donor component to the molar content of the acceptor component is greater than 0.1 and less than 0.32.

7. The dielectric composition of claim 1, wherein the dielectric composition excludes Gd.

8. A multilayer capacitor comprising:
a body including a laminated structure in which at least one first internal electrode and at least one second internal electrode are alternately stacked in a first direction with at least one dielectric layer interposed therebetween; and
first and second external electrodes disposed on the body and spaced apart from each other to be connected to the at least one first internal electrode and the at least one second internal electrode, respectively,
wherein the at least one dielectric layer includes the dielectric composition of claim 7.

9. The dielectric composition of claim 1, wherein the acceptor component includes Mg.

10. The dielectric composition of claim 1, consisting of:
the $BaTiO_3$-based component;
the donor component consisting of dysprosium (Dy) and samarium (Sm); and
the acceptor component consisting of Mg, Al, Mn and V.

11. A multilayer capacitor comprising:
a body including a laminated structure in which at least one first internal electrode and at least one second internal electrode are alternately stacked in a first direction with at least one dielectric layer interposed therebetween; and
first and second external electrodes disposed on the body and spaced apart from each other to be connected to the at least one first internal electrode and the at least one second internal electrode, respectively,
wherein the at least one dielectric layer includes the dielectric composition of claim 1.

12. The dielectric composition of claim 1, wherein $BaTiO_3$ is the main component, and the acceptor component includes V at 2.36 mol relative to 100 mol of barium titanate.

13. The dielectric composition of claim 1, wherein $BaTiO_3$ is the main component, and the acceptor component includes Al at 4.81 mol relative to 100 mol of barium titanate.

14. A dielectric composition comprising:
a $BaTiO_3$-based component as a main component; and
an accessory component including a lanthanide element including dysprosium (Dy) and samarium (Sm),
wherein a total molar content of the lanthanide element in the accessory component is greater than 0 mol and less than 2.41 mol relative to 100 mol of titanium (Ti) as the main component, and
a ratio of a molar content of the samarium (Sm) to the total molar content of the lanthanide element in the accessory component is greater than 0.04 and less than 0.24.

15. The dielectric composition of claim 14, wherein the total molar content of the lanthanide element in the accessory component is greater than 0 mol and less than 1.35 mol relative to 100 mol of titanium (Ti) as the main component, and
the molar content of the samarium (Sm) in the accessory component is greater than 0 mol and less than 0.22 mol relative to 100 mol of titanium (Ti) as the main component.

16. The dielectric composition of claim 14, wherein the accessory component further comprises at least one of Mg, Al, Mn, and V,
wherein a total molar content of Mg, Al, Mn, and V in the accessory component is greater than the total molar content of the lanthanide element in the accessory component.

17. The dielectric composition of claim 16, wherein a ratio of the total molar content of the lanthanide element in the accessory component to the total molar content of Mg, Al, Mn, and V in the accessory component is greater than 0.1 and less than 0.32.

18. The dielectric composition of claim 16, wherein the accessory component comprises Mg.

19. The dielectric composition of claim 14, wherein the dielectric composition excludes Gd.

20. The dielectric composition of claim 14, consisting of:
the $BaTiO_3$-based component; and
the accessory component consisting of dysprosium (Dy), samarium (Sm), Mg, Al, Mn and V.

* * * * *